(12) United States Patent
Ohno et al.

(10) Patent No.: US 8,780,385 B2
(45) Date of Patent: Jul. 15, 2014

(54) DIGITAL BROADCAST RECEIVER AND DIGITAL BROADCAST RECEIVER CONTROL METHOD

(75) Inventors: Tomoyuki Ohno, Zama (JP); Yuichi Matsumoto, Fujisawa (JP); Shinya Oda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 12/669,774

(22) PCT Filed: Sep. 10, 2008

(86) PCT No.: PCT/JP2008/066799
§ 371 (c)(1),
(2), (4) Date: Jan. 19, 2010

(87) PCT Pub. No.: WO2009/044636
PCT Pub. Date: Apr. 9, 2009

(65) Prior Publication Data
US 2010/0195148 A1 Aug. 5, 2010

(30) Foreign Application Priority Data

Oct. 2, 2007 (JP) .................................. 2007-258889

(51) Int. Cl.
G06F 3/12 (2006.01)
H04N 21/81 (2011.01)
H04N 21/41 (2011.01)
H04H 60/13 (2008.01)
H04N 21/435 (2011.01)
H04N 1/00 (2006.01)

(52) U.S. Cl.
CPC ............ *H04H 60/13* (2013.01); *H04N 21/8126* (2013.01); *H04N 21/4117* (2013.01); *H04N 21/435* (2013.01)

USPC ......... 358/1.15; 358/1.18; 358/1.13; 358/1.1; 358/504; 358/406; 348/552; 348/553; 725/131; 725/133; 725/151; 725/153

(58) Field of Classification Search
CPC ..... H04N 21/235; H04N 21/435; H04N 5/00; H04N 7/24; G06F 3/1296; G06F 8/65
USPC .......... 358/1.11–1.18, 1.8, 1.9, 1.1, 500, 296, 358/461, 468; 725/131–133, 37–61, 725/139–141, 112; 400/62; 348/553, 552, 348/460–463, 734, 473; 709/201–203, 206, 709/220; 347/23, 3, 14, 19, 22, 24, 29–33
See application file for complete search history.

(56) References Cited

U.S. PATENT DOCUMENTS 7,296,234 B2   11/2007  Fukuda et al.
(Continued)

FOREIGN PATENT DOCUMENTS

| JP | 2001-331290 A | 11/2001 |
| JP | 2003-334994 A | 11/2003 |
| JP | 2004-5428 A | 1/2004 |

*Primary Examiner* — Chad Dickerson
(74) *Attorney, Agent, or Firm* — Fitzpatrick, Cella, Harper & Scinto

(57) ABSTRACT

A print control unit 118 that, once it receives a datacasting automatic activation notification or a datacasting manual activation notification, determines whether or not datacasting is present for a currently selected channel. In a case in which datacasting is present, the print control unit 118 acquires maintenance information acquired from a printer 200 through a maintenance information acquisition process. Based on the acquired maintenance information, the print control unit 118 determines whether or not to issue a command to the printer 200 requesting execution of a maintenance process.

8 Claims, 6 Drawing Sheets

(56) References Cited

U.S. PATENT DOCUMENTS

| | | | |
|---|---|---|---|
| 7,478,124 B2* | 1/2009 | Huang | 709/203 |
| 2002/0062487 A1* | 5/2002 | Ohno et al. | 725/133 |
| 2003/0137552 A1* | 7/2003 | Im et al. | 347/23 |
| 2003/0164973 A1* | 9/2003 | Hisatomi et al. | 358/1.15 |
| 2005/0158100 A1* | 7/2005 | Yamaguchi et al. | 400/62 |
| 2005/0169685 A1* | 8/2005 | Matsubayashi et al. | 400/62 |

* cited by examiner

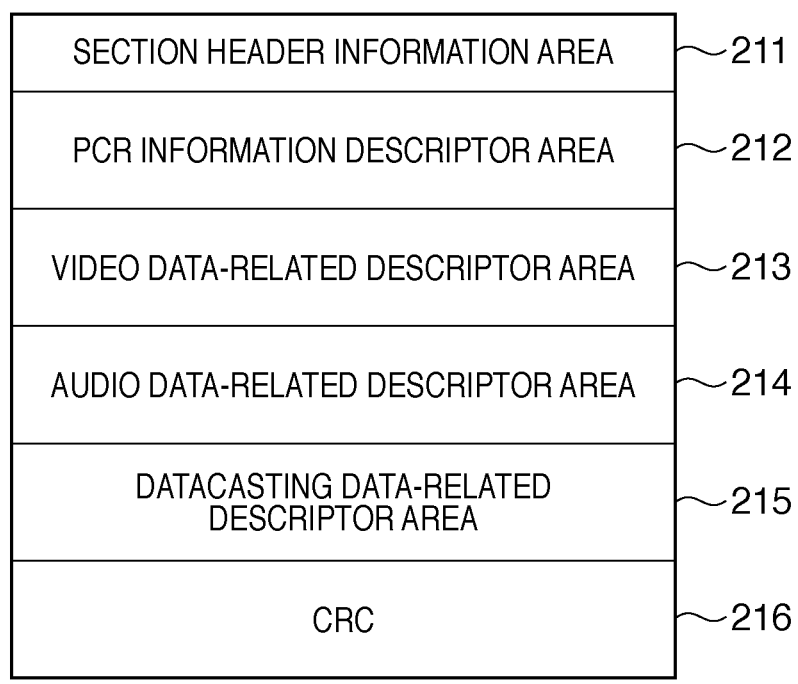
F I G. 2

DIGITAL BROADCAST RECEIVER AND DIGITAL BROADCAST RECEIVER CONTROL METHOD

This application is a National Stage application under 35 U.S.C. §371 of International Application No. PCT/JP2008/066799 filed on Sep. 10, 2008, which claims priority to Japanese Application No. 2007-258889, filed on Oct. 2, 2007, the contents of each of the foregoing applications being incorporated by reference herein.

TECHNICAL FIELD

The present invention relates to a digital broadcast receiver and a digital broadcast receiver control method that cause a printing apparatus to print based on print information transmitted via digital broadcasting.

BACKGROUND ART

In Japan, as one type of broadcasting service of terrestrial digital broadcasting, datacasting printing service is being carried out. Datacasting printing service can be received by a digital television (hereinafter referred to as a DTV) that has the ability to control a printing apparatus (hereinafter referred to as a printer). A user possessing a DTV that can handle datacasting printing can print information on programs, weather forecasts, news information and the like using a printer connected to the DTV and obtain print contents.

Standards for broadcasting and operational guidelines relating to datacasting printing service in Japan are described in Association of Radio Industries and Businesses (ARIB) "Data Coding and Transmission Specification for Digital Broadcasting" ARIB STD-B24 version 4.4 (hereinafter referred to as Document 1) and Association of Radio Industries and Businesses (ARIB) "Operational Guidelines for Digital Terrestrial Television Broadcasting" ARIB TR-B14 version 2.7 (hereinafter referred to as Document 2). Based on these documents, the printing formats that DTV can execute as datacasting printing services can be broadly divided into the following three types:

Printing scheme (1): The DTV acquires print data included in the broadcast signals and requests that the printer print.

Printing scheme (2): The DTV captures the datacasting screen that is currently being displayed and requests that the printer print.

Printing scheme (3): The DTV requests that the printer print print data present on a server on the internet.

However, at the printer, it sometimes happens that, depending on usage environment conditions such as temperature, humidity, and time elapsed, the tint of the printed contents changes or becomes blurred. In order to reduce the occurrence of such phenomena, the printer executes a maintenance process immediately after the printer power is turned on, when executing printing, or after a predetermined time elapsed since the preceding print execution. In order to avoid unnecessary maintenance processes, it is now common to execute the maintenance process after detecting that printing has actually been executed. However, because the time required for the maintenance process can sometimes take several minutes, if a maintenance process is executed when executing printing, the user cannot obtain the print contents quickly.

In order to deal with this type of problem, a technique is disclosed in JP-2003-334994-A in which, by detecting the activation of application software that frequently involves the execution of printing and automatically requesting a maintenance process, the time to obtain print contents can be shortened.

The datacasting printing service described above mainly has broadcast program-related print contents, for example, print contents consisting of local information introduced by a program. Therefore, ordinarily, acquisition of datacasting print contents associated with the program necessarily is associated with the broadcast time of the program. Therefore, once broadcasting of the program ends, so too does the opportunity to obtain print contents. In other words, there is a problem in that, with the datacasting printing service, once the broadcast program ends the print contents cannot be acquired from the broadcast signals or from the server.

In addition, with the datacasting printing service described above, the print contents are often revised/updated or deleted as the broadcast program proceeds. For example, in the first 15 minutes of a 1-hour quiz program answer sheet print data may be transmitted, and in the last 15 minutes answer result print data may be transmitted. In such a case, print data time control is stricter than in a case in which the print data is associated with the broadcast time of the program as described above.

Consequently, in a case in which the printer has started to execute a maintenance process in response to a user instruction to print the print contents, if the maintenance process is not finished within a time period in which the print data can be acquired, there is a possibility that the user might be unable to obtain the print contents.

It might be thought possible to arrange matters so that the maintenance process is executed at short intervals so as to enable the user to execute printing at any time. However, leaving the power to the printer ON and executing maintenance processes regardless of the fact that the user is not executing printing is not only a consumption of power and ink in excess of that which is required but is also likely to produce discomfort in the form of frequent emission of operating noise as well.

DISCLOSURE OF INVENTION

The present invention has been made in consideration of the above situation, and has as its object to provide a digital broadcast receiver and a digital broadcast receiver control method that provide proper maintenance execution control while reducing the possibility of being unable to acquire print contents to a minimum even in a case in which there is a limit on a time period for the acquisition of print contents.

According to the present invention, the foregoing object is attained by providing a digital broadcast receiver that receives digital broadcasts and is capable of outputting print information included in the digital broadcast to a communicably connected printing apparatus, the digital broadcast receiver comprising: an acquisition unit that acquires from the printing apparatus maintenance information indicating whether or not the printing apparatus requires a maintenance process; a determination unit that determines whether or not datacasting is present for a currently selected channel; and a control unit that, in a case in which it is determined by the determination unit that datacasting is present, determines whether or not to issue a command to the printing apparatus to execute a maintenance process based on the acquired maintenance information.

According to the present invention, the foregoing object is also attained by providing a digital broadcast receiver control method for a digital broadcast receiver that receives digital broadcasts and is capable of outputting print information included in the digital broadcast to a communicably connected printing apparatus, the digital broadcast receiver control method comprising: an acquisition step of acquiring from the printing apparatus maintenance information indicating whether or not the printing apparatus requires a maintenance process; a determination step of determining whether or not datacasting is present for a currently selected channel; and a control step of, in a case in which it is determined in the determination step that datacasting is present, determining whether or not to issue a command to the printing apparatus to execute a maintenance process based on the acquired maintenance information.

Further features of the present invention will become apparent from the following description of exemplary embodiments (with reference to the attached drawings).

BRIEF DESCRIPTION OF DRAWINGS

FIG. 2 is a diagram showing the structure of a PMT in the present invention;

BEST MODE FOR CARRYING OUT THE INVENTION

Preferred embodiments of the present invention will now be described in detail in accordance with the accompanying drawings. The specific embodiments described below serve to facilitate an understanding of the various concepts of the present invention, from the most general to the most specific.

It is to be noted that the technical scope of the present invention is determined by the claims, and is not limited to the specific embodiments described below. In addition, not all the combinations of features described in the embodiment are essential to the present invention.

[First Embodiment]

A description is now given of a first embodiment of the present invention, using the drawings.

Figure 1:
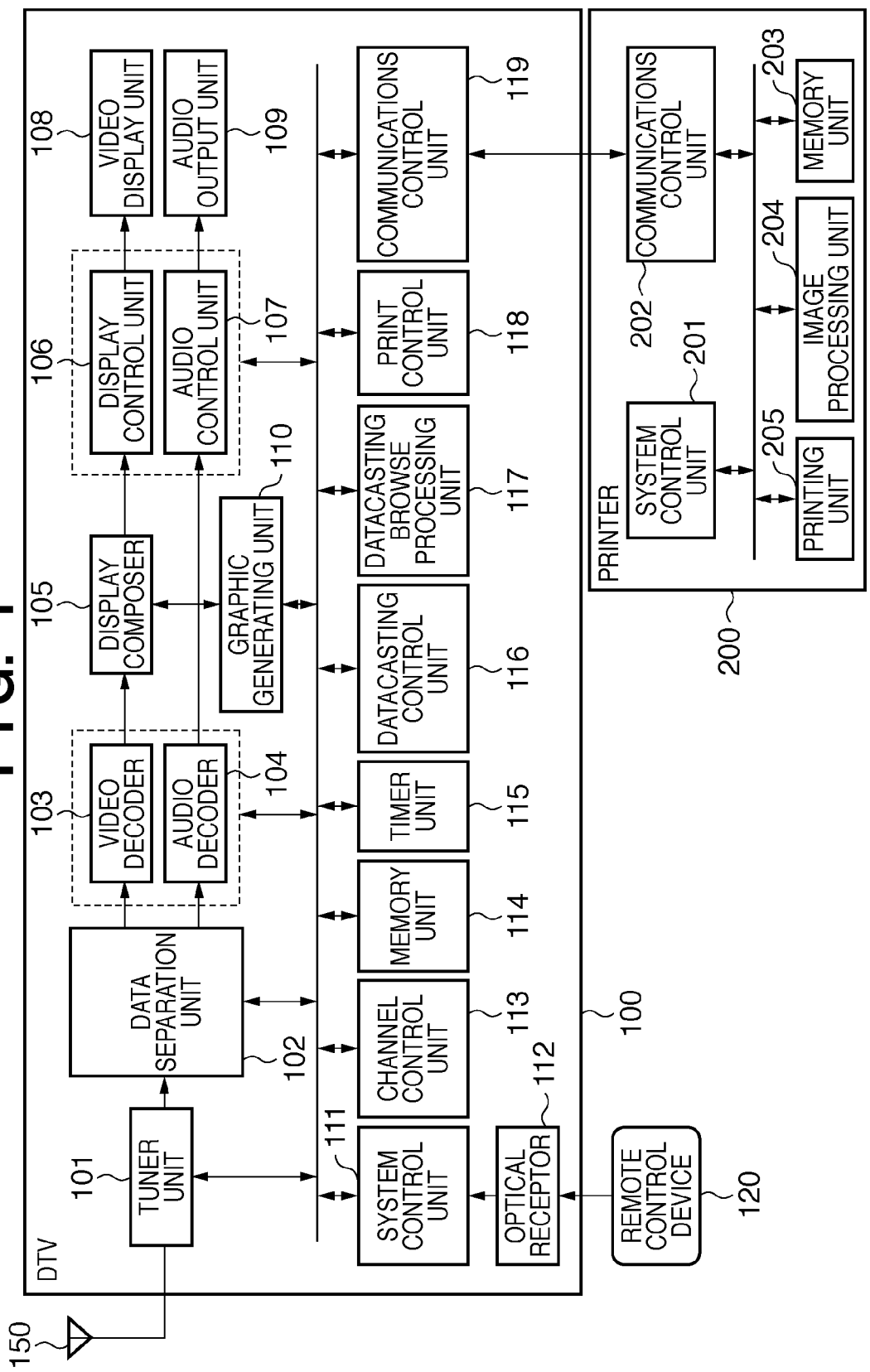
FIG. 1 is a diagram showing a schematic configuration of a DTV 100 and a printer 200 of the present invention.

FIG. 1 is a diagram showing a system composed of a digital broadcast receiver and a printing apparatus applying the first embodiment of the present invention. It is to be noted that, in the embodiments of the present invention, the digital broadcast receiver is a DTV 100, and the printing apparatus is a printer 200.

(Configuration of the DTV 100)

As a television receiver basic capability, the DTV 100 is equipped with a display function for television program video generated from broadcast signals and received through an antenna 150. In addition, as expansion capabilities, the DTV 100 is equipped with a datacasting browse capability and a datacasting printing control capability as specified in Document 1 and Document 2.

The DTV 100 and the printer 200 are connected to each other through a network such as Ethernet (registered trademark), and are able to transmit and receive information to and from each other. Specifically, the DTV 100 and the printer 200 are able to communicate with each other based on the UPnP (Universal Plug & Play) technical specification. A description of the UPnP technical standard specification will be omitted here, however, and the control process of the printer 200 in the present embodiment is implemented by transmission and reception of actions and events based on the UPnP technical standard specification "PrintEn hanced: 1".

Next, a description is given of the internal configuration of the DTV 100 using FIG. 1. A tuner unit 101 carries out such processes as demodulation, error correction and the like on broadcast signals input through the antenna 150. Thereafter, the tuner unit 101 forms a transport stream (TS) that it then outputs to a data separation unit 102. In the TS are multiplexed video and audio data of one or more channels as well as current date and time information, program information data, datacasting data, and print information for one or more channels. It is to be noted that MPEG-2TS is used for the TS in terrestrial digital broadcasting in Japan at present.

In the current date and time information are included information indicating the current date and time, such as the year, the month, the day, and the hour, minute, and second. In the program information are included program titles, descriptions of program contents, broadcast channel and broadcast time information (starting time and duration), and the like. It is to be noted that datacasting data and print information are multiplexed in the TS using the DSM-CC data carousel scheme specified and described in ISO/IEC 13818-6 and in Document 1.

The data separation unit 102 carries out separation of video, audio, and datacasting data for a desired channel from the TS. The video data separated out by the data separation unit 102 is output to a video decoder 103, where it is subjected to video demodulation processing based on the MPEG-2 standard or the like.

The video data demodulated by the video decoder 103 is output to a display control unit 106 through a display composer 105. The display composer 105 has the ability to combine video data demodulated by the video decoder 103 and graphic data that a graphic generating unit 110 generates.

The display control unit 106 converts the video data into a video signal suitable for a display resolution, display color number, and refresh rate of a video display unit 108, and outputs the video signal to the video display unit 108. The video display unit 108 displays the input video signal.

The audio data separated out by the data separation unit 102 is output to an audio decoder 104 and subjected to decoding processing based on the MPEG-2 standard or the like. The decoded audio data is output to an audio control unit 107. At the audio control unit 107, the decoded audio data is subjected to audio correction processing and the like and output to an audio output unit 109. The audio output unit 109 outputs the input audio signal.

The datacasting data separated out by the data separation unit 102 is accumulated in a memory unit 114. In addition, the data separation unit 102 also carries out separation of current date and time information and program information data from the TS. The program information data is accumulated in the memory unit 114 in the same way as is the datacasting data. The current date and time information is output to a timer unit 115.

In addition, the data separation unit 102 also extracts a PAT (Program Association Table) included in the TS, which is then sent to a channel control unit 113. The PAT contains information for managing programs, and more specifically, information for managing a program included in the stream.

The graphic generating unit 110 generates an OSD (On Screen Display) graphic, such as a menu screen displayed on the video display unit 108, and outputs the generated graphic to the display composer 105.

A system control unit 111 functions as a central control unit exercising various sorts of control over the DTV 100.

An optical receptor 112 has the ability to receive optical signals emitted from a remote control device 120. The optical receptor 112 converts received light from the remote control device 120 into control signals, which it then transmits to the system control unit 111.

The channel control unit 113 is a control unit that carries out control relating to channel selection operations of the DTV 100. The channel control unit 113 executes PMT analysis, channel selection processing based on instructions from the system control unit 111, and determination and revision of information to identify whether datacasting is present. A detailed description of the channel control unit 113 is given later.

The memory unit 114, as described above, functions as a storage area to store datacasting data and program information data.

The timer unit 115 is equipped with a function to execute counting of time. For example, the timer unit 115 regularly counts a predetermined time interval, and based on a count signal output from the timer unit 115, the channel control unit 113 instructs the data separation unit 102 to separate out the current date and time information and the program information data. As described above, the current date and time information separated out at the data separation unit 102 is input to the timer unit 115.

A datacasting control unit 116 is a control unit that exerts control related to datacasting. The datacasting control unit 116, in a case in which there is an instruction from the system control unit 111 to display datacasting, carries out processing to convert the datacasting data accumulated in the memory unit 114 into displayable data using a datacasting browse processing unit 117.

The datacasting browse processing unit 117 analyzes the datacasting data and executes a rendering generation process on a datacasting screen in conjunction with the graphic generating unit 110.

A print control unit 118 is a control unit for providing a print capability using a DTV. The print control unit 118, based on printer 200 status information and the like, carries out control of the three types of printing processes described above.

A communications control unit 119 is a control unit for executing control relating to communication with and connection to an external device connected to the DTV 100 through a network or the like. As described above, the DTV 100 and the printer 200 exchange information using the UPnP specification, and in a case in which the printer 200 is connected, the communications control unit 119 carries out control such that, using the UPnP discovery function, the DTV 100 automatically recognizes the printer 200.

(Detailed Description of the Channel Control Unit 113)

By analyzing the PAT transmitted from the data separation unit 102, the channel control unit 113 recognizes a PID (Packet Identifier) of a PMT (Program Map Table) relating to a desired channel. The PMT contains information for managing such data as the video and audio data that constitute the program. In addition, the PID is a MPEG-2TS packet identifier, and is used to identify the TS packet type.

The structure of the PMT is shown in FIG. 2. It is to be noted that details relating to the structure and grammar of the PMT are specified and described in ISO/IEC 13818-1 and in Document 2.

Section header information area 211 is an area in which information for ascertaining the data length of the PMT as well as the channel number, the PMT version number, and the like are described. The PMT version number is revised in the event that there is a change in the structure of the video, audio, and datacasting data that constitute the program.

PCR information descriptor area 212 is an area in which information such as a PID of a TS packet, which includes PCR (Program Clock Reference) information, is described. The PCR is a value that becomes the program clock reference.

Video data-related descriptor area 213 is an area in which information such as the PID of the TS packet which includes the video data that constitutes the program, is described.

Audio data-related descriptor area 214 is an area in which information such as the PID of the TS packet which includes the audio data that constitutes the program, is described.

Datacasting data-related descriptor area 215 is an area in which such information as the PID of the TS packet which includes print information as well as datacasting data that constitute the program, and instruction information from the broadcaster as to whether or not to commence the datacasting process immediately, is described.

CRC 216 is an area in which CRC (Cyclic Redundancy Check) information, used for confirming that there is no error when the PMT is received, is described.

The channel control unit 113, by analyzing the PMT, acquires such information as the PID of the TS packet, which includes the video data and the audio data relating to the program, and the datacasting data, and requests that the data separation unit 102 separate out the video, audio, and datacasting data.

In addition, the channel control unit 113, based on the results of the analysis of the PMT, identifies whether or not there is datacasting for the channel that is currently in the process of starting to be viewed. Subsequently, the results of that identification are accumulated in the memory unit 114 as datacasting presence/absence information. By analyzing the datacasting data-related descriptor area 215 of the PMT shown in FIG. 2, the channel control unit 113 can identify whether or not there is datacasting for the selected channel. The datacasting presence/absence information may be expressed by a flag, such that, for example, when datacasting is present the flag is "1", and when datacasting is not present or when power to the DTV is turned off the flag is "0".

In addition, in a case in which there is instruction information from the broadcaster in the portion indicated by the datacasting data-related descriptor area 215 indicating that the datacasting process is to commence immediately, the channel control unit 113 so notifies the system control unit 111. This notification is called datacasting automatic activation notification. The system control unit 111 forwards the datacasting automatic activation notification to the print control unit 118.

(Configuration of the Printer)

Next, a description is given of the configuration of the printer 200 as the printing apparatus. The printer 200 may, for example, be an ink jet-type printer. A system control unit 201 that exerts overall control of the printer 200 is provided in the printer 200.

A communications control unit 202 is a control unit that has an interface connected to the communications control unit 119 of the DTV 100 through a network, and executes various sorts of control related to communications and device connection.

A memory unit 203 accumulates print information and information transmitted from the DTV 100, and also is used as an area for developing data into a data format for printing in a case in which the print information is the actual print contents data.

An image processing unit 204 has the ability to implement a variety of image processes on the print data, such as color correction, rotation and scaling, and the like.

The printing unit 205 has a function for printing information based on print data onto a recording medium such as paper or the like. In the case of an ink jet printer, the printing unit 205 is equipped with a head that ejects ink, an ink tank, and so forth.

(Commencing Viewing of a Broadcast Program)

Next, a description is given of a process for commencing viewing of a television broadcast program on the DTV 100.

First, the user carries out a DTV 100 power-on operation and a channel designation operation by manipulating the remote control device 120. The system control unit 111, based on operation information from the remote control device 120 that is received through the optical receptor 112, instructs the channel control unit 113 to select the channel that the user desires. The channel control unit 113, based on the channel designation from the system control unit 111, starts to control the tuner unit 101 and the data separation unit 102. The channel that the user desires is selected by the tuner unit 101 and the TS for that channel is separated out by the data separation unit 102, enabling the video and the audio for the channel to be output from the video display unit 108 and the audio output unit 109. Thus is the user enabled to commence viewing of the program.

It is to be noted that the channel control unit 113, based on a channel designation from the system control unit 111, accumulates information for that channel in the memory unit 114.

(Description of Datacasting Browse Capability and Datacasting Print Capability)

Next, a description is given of the datacasting browse capability and datacasting print capability with which the DTV 100 is equipped. The datacasting browse capability is a capability that displays datacasting data (data for displaying datacasting) repeatedly multiplexed in the TS by a data carousel scheme on the video display unit 108. It is to be noted that, in a case in which audio data is attached to the datacasting, the datacasting data can be output from the audio output unit 109.

Included in the datacasting data are text information, display layout information, script information, still image information, audio information, and so forth. The text information is written in BML (Broadcast Markup Language), which is a page descriptor language for datacasting defined on the basis of the XML (eXtensible Markup Language) specified in Document 1 and Document 2.

The display layout information provides a CSS (Cascading Style Sheet) file for defining the layout of a text or image file written in BML. Standard specification ECMAScript is used as script information embedded in the BML as a simplified program. Further, DOM (Document Object Model) is used as means for accessing to the logical structure of the BML and the information, as well as for carrying out operations.

In order to display the datacasting data, the DTV 100 is provided with a datacasting browse processing unit 117. The datacasting browse processing unit 117 is loaded with a BML browser application for interpreting the BML and CSS and generating a datacasting screen.

Figure 3:
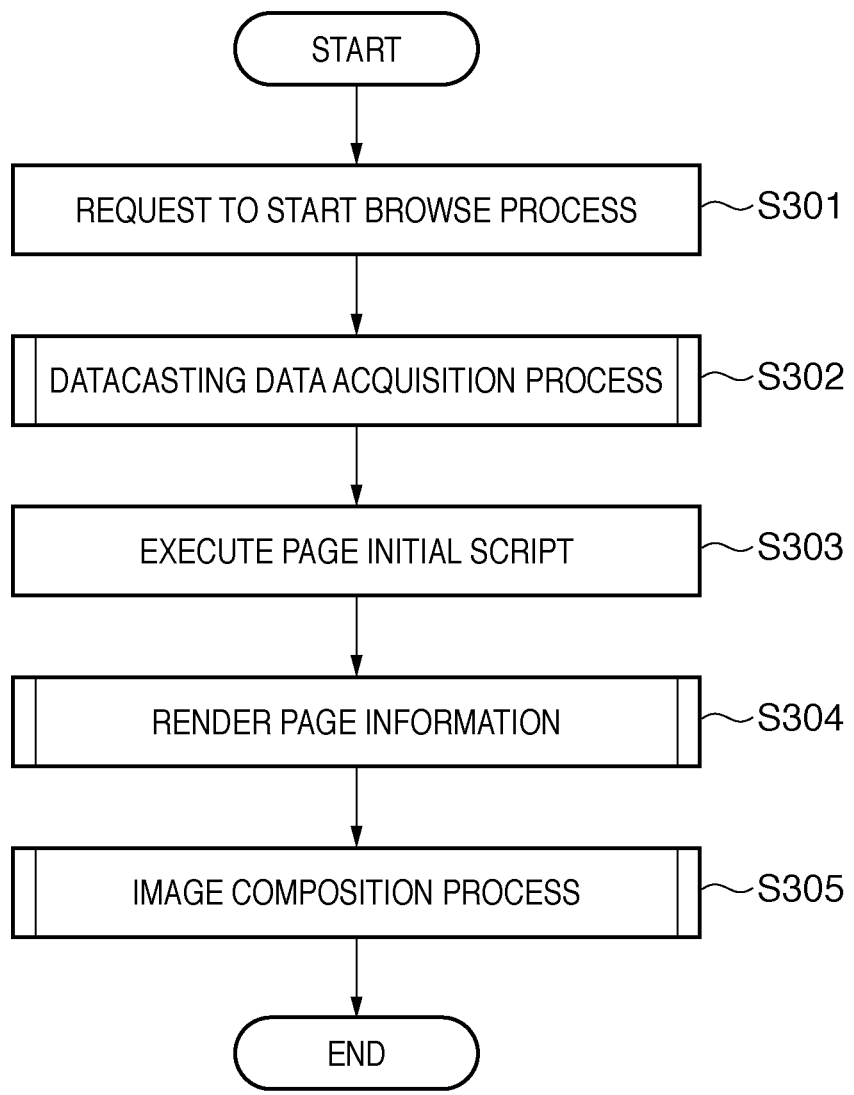
FIG. 3 is a flow chart illustrating a datacasting browse process in the present invention.

In order to display the datacasting screen, first, the system control unit 111 requests that the datacasting control unit 116 start a datacasting browse process so as to display the datacasting. Below, a description is given of the datacasting browse process, using the flow chart shown in FIG. 3.

First, in step S301, the system control unit 111 requests that the datacasting control unit 116 start the datacasting browse process so as to display the datacasting.

Next, in step S302, the datacasting control unit 116 acquires the datacasting data accumulated in the memory unit 114. In the event that the data necessary for the browse is not accumulated in the memory unit 114, the datacasting control unit 116 issues a datacasting data acquisition request to the data separation unit 102. Then, the datacasting control unit 116 sends the acquired datacasting data to the datacasting browse processing unit 117 and requests browse processing.

Next, in step S303, the datacasting browse processing unit 117, once it acquires the BML data as well as related images and the like, executes a script function described in the Onload attribute of the <body> tag as an initial script. This script function first calls up a function for querying whether or not the DTV 100 has a print capability. The datacasting browse processing unit 117 has, as an embedded function API which can be called up from this script function, an expansion function DOM-API called getBrowserSupport( ). This getBrowserSupport( ), when given the character string ""ARIB", "APIGroup", "Print.Basic"" as an argument, returns "1" or "0". "1" means that the DTV 100 has a print capability and "0" means that the DTV 100 does not have a print capability. The getBrowserSupport( ) attendant upon the argument ""ARIB", "APIGroup", "Print.Basic"" is always executed during datacasting browse when print information is present. Therefore, in a case in which the datacasting browse processing unit 117 has executed the getBrowserSupport( ) attendant upon the argument ""ARIB", "APIGroup", "Print.Basic"", it can be detected that print information is included in the datacasting. The datacasting browse processing unit 117 generates print information presence/absence information based on that detection result.

It is to be noted that the return value (1 or 0) resulting from the execution of getBrowserSupport( ) attendant upon the argument ""ARIB", "APIGroup", "Print.Basic"" is information for the purpose of determining whether or not the DTV 100 has a print capability. The return value is stored in the memory unit 114. Information for determining whether or not the DTV 100 has a print capability is called print capability present/absence information. Based on the print capability present/absence information, the datacasting browse processing unit 117 determines whether or not to render button images and text information relating to printing on the screen. Assuming hypothetically a case in which the DTV 100 does not have a datacasting print capability, the button images and text information relating to printing are not rendered on the screen, and thus the user cannot execute printing of the datacasting.

Next, in step S304, the datacasting browse processing unit 117, through the graphic generating unit 110, carries out rendering of the button images and text information. Subsequently, in step S305, the display composer 105 carries out a process of composing the datacasting screen rendered by the datacasting browse processing unit 117 and a moving image from the video decoder 103.

The composed datacasting screen is displayed on the video display unit 108. By manipulating a print button or other UI in the datacasting screen, the user can input a print request to the DTV 100 and request execution of a printing process.

It is to be noted that the method for executing a datacasting browse process assumes reception of datacasting screen display instruction input from the user. In general, the user pressing a datacasting display button provided on the remote control device 120 results in the system control unit 111 requesting that the datacasting control unit 116 start the datacasting browse process.

As other methods, there is one not of instruction input from the user but of the system control unit 111 receiving a datacasting automatic activation notification command from the channel control unit 113. In this method, even in the absence of instruction input from the user it is still possible to display datacasting automatically.

It is to be noted that, in the present embodiment, the system control unit 111, once it receives input instructing datacasting display from the user, transmits that information to the print control unit 118. The information transmitted here is called datacasting manual activation notification.

Next, a description is given of the datacasting print capability. The datacasting print capability is a capability for achieving the following three types of printing schemes. It is to be noted that these printing schemes are the same as those described in the Background Art section.

Printing scheme (1): The DTV acquires print data included in the broadcast signals and requests the printer to print. This is called PrintFile processing.

Printing scheme (2): The DTV captures the datacasting screen that is currently being displayed and requests the printer to print. This is called PrintStaticScreen processing.

Printing format (3): The DTV requests that printer to print print data present on a server on the internet. This is called PrintUri processing.

The datacasting browse processing unit 117, while the datacasting screen is being displayed, waits for reception of some sort of request from the user through the remote control device 120. When there is a request from the user, the datacasting browse processing unit 117 carries out a process of determining the content of the request and executes processing according to the determination results.

For example, in a case in which there has been a focus moving request, the datacasting browse processing unit 117 executes a focus moving process. In a case in which there has been a screen change request, the datacasting browse processing unit 117 executes a screen change process.

In the event that the DTV 100 does have a print capability, the datacasting browse processing unit 117 carries out display to the effect that it is possible to accept a print request from the user. For example, in a case in which print information is attached to datacasting that is being displayed, the datacasting browse processing unit 117 displays a print button for the user to request printing. In the event that the DTV 100 does not have a print capability, in general display of a print button or the like is not carried out even if print information is attached to the datacasting being displayed.

The datacasting browse processing unit 117, once it determines that there has been a print request from the user, requests that the print control unit 118 execute printFile processing, printStaticScreen processing, printUri processing, and the like. In addition, in the print control between the DTV 100 and the printer 200 in the present embodiment, PrintEnhanced: 1 provided by UPnP is used.

The datacasting data contains as print information print contents to be printed by the printer 200. In this case, the print information included in the datacasting data is the print data itself. Alternatively, the datacasting data may contain as print information a URI (Universal Resource Identifier) indicating the location of the print contents. In the former case, the datacasting browse processing unit 117 requests that the print control unit 118 execute printFile processing when a print request is input from the user. In the latter case, the datacasting browse processing unit 117 requests that the print control unit 118 execute printUri processing when a print request is input from the user.

Here, a print request is a request to execute a printing process based on print information included in the digital broadcast signal being received. In addition, datacasting data is associated with the channels of the digital broadcast signal being received, and a print request, for example, is a request to execute a printing process based on the print information included in the datacasting data associated with the channel currently selected.

(About the Operation of Acquiring Maintenance Information from the Printer)

Next, a description is given of a printer 200 maintenance information acquisition process that the DTV 100 carries out. It is to be noted that printer 200 maintenance information in the present embodiment is information that identifies whether or not the printer 200 is currently in a state in which the print output characteristics of the printer itself require correction. Correction of print output characteristics includes, for example, cleaning of the printer 200 print head and checking it for blockage.

Figure 4:
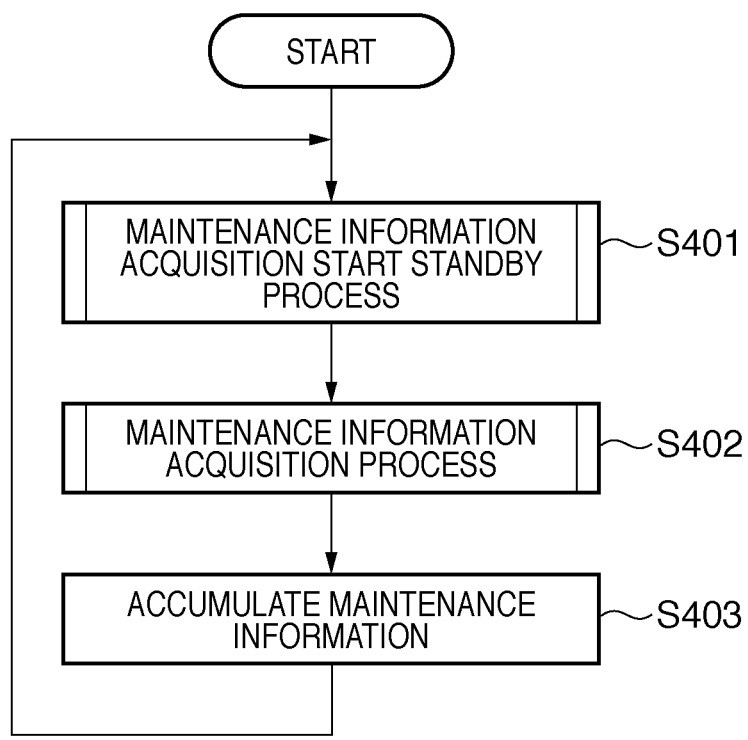
FIG. 4 is a flow chart illustrating a maintenance information acquisition process in the present invention.

FIG. 4 is a flow chart illustrating an example of a maintenance information acquisition process in the present invention. It is assumed that the flow is executed chiefly by the print control unit 118.

First, in step S401, the print control unit 118 is in a state in which it is waiting to start acquisition of printer 200 maintenance information. In this standby state, the print control unit 118 starts the process of acquiring maintenance information in step S402 in the event that the following conditions are present: (1) Whenever the communications control unit 119 has detected the connected printer 200. It is to be noted that detection of the printer 200 is executed on the basis of a discovery function stipulated by UPnP in a case in which power to both the DTV 100 and the printer 200 is ON, and further, the DTV 100 and the printer 200 are able to communicate with each other. (2) Whenever a certain time period has elapsed after detection of the printer 200. It is to be noted that, in the present embodiment, this certain time period is 8 minutes, and the elapsed time is counted by the timer unit 115 which notifies the print control unit 118.

In step S402, the print control unit 118 executes a process of acquiring maintenance information on the printer 200. In this step, the print control unit 118, through the communications control unit 119, transmits a command called "GetMaintenanceInfo( )" to the printer 200. "GetMaintenanceInfo( )" is an expanded action of "PrintEnhanced: 1".

Once the communications control unit 202 of the printer 200 receives "GetMaintenanceInfo( )", it sends that information to the system control unit 201. The system control unit 201 transmits certain previously stored maintenance information to the DTV 100 through the communications control unit 202.

The print control unit 118 of the DTV 100 acquires the maintenance information transmitted from the printer 200 through the communications control unit 119. The acquired maintenance information is information indicated whether the printer 200 requires maintenance prior to print execution or does not require maintenance prior to print execution.

Next, in step S401, the print control unit 118 accumulates the maintenance information acquired from the printer 200 in the memory unit 114. Subsequently, the process moves to step S404, and the print control unit 118 waits to process until the two conditions described above are again detected.

The above-described process enables the DTV 100 to acquire printer 200 maintenance information.

(About the Process of Requesting the Printer to Execute Maintenance)

Next, a description is given of the process of the DTV 100 requesting the printer 200 to execute a maintenance process on the printer 200.

Figure 5:
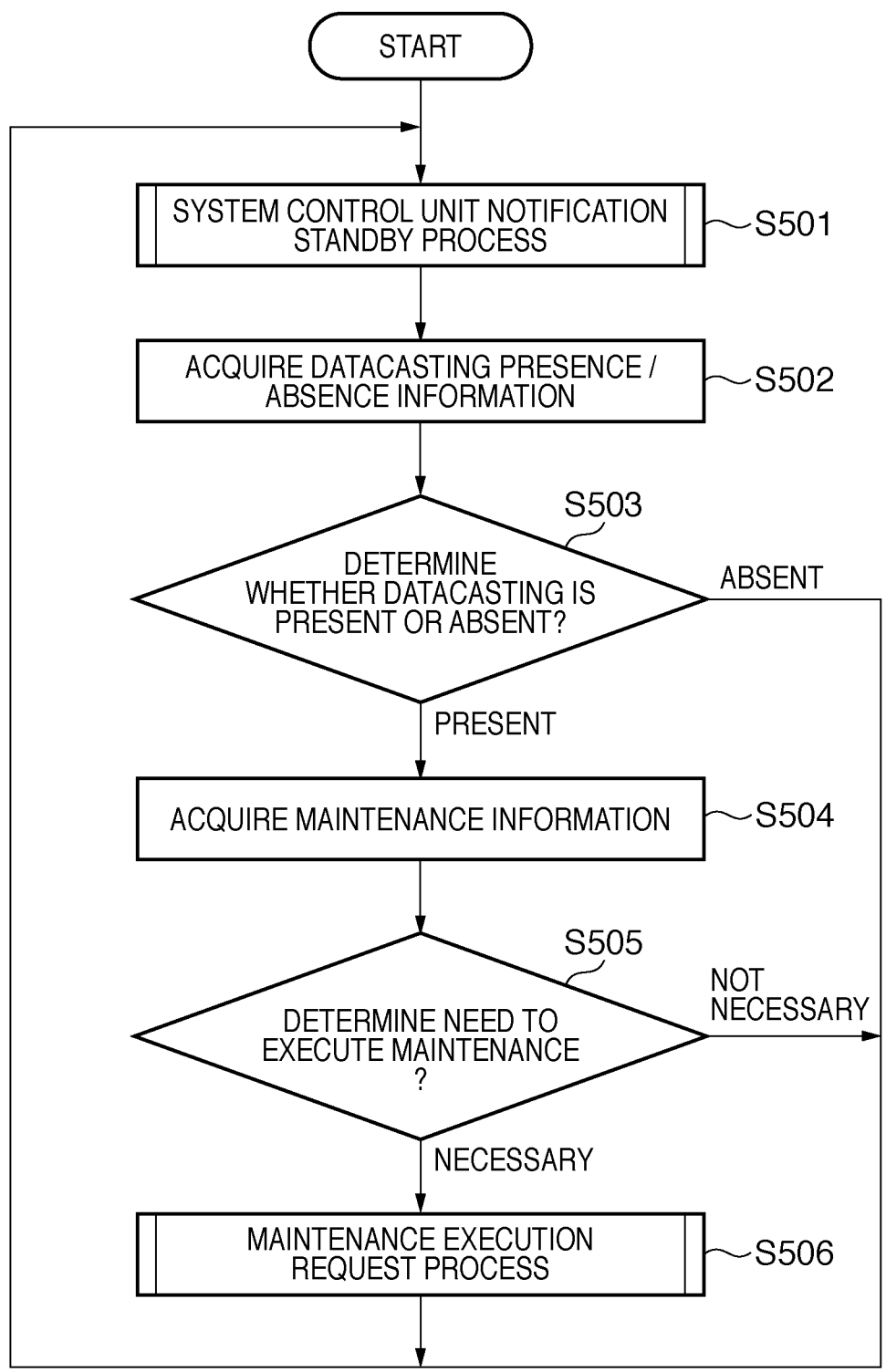
FIG. 5 is a flow chart illustrating a maintenance execution request process according to a first embodiment of the present invention.

FIG. 5 is a flow chart illustrating a maintenance execution request process executed by the DTV 100.

First, in step S501, the print control unit 118 is in a standby state awaiting notification of various types of notification information transmitted from the system control unit 111. These various types of notification information are either datacasting automatic activation notification or datacasting manual activation notification. The print control unit 118 waits until it receives one of these two types of notification information.

In step S501, the print control unit 118, once it receives either of the two types of notification information, moves the process to step S502. That is, the print control unit 118, in a case in which a process for starting datacasting browse has been executed by an automatic activation notification either by user input or from the broadcaster, executes the following process.

In step S502, the print control unit 118 acquires datacasting presence/absence identification information from the memory unit 114.

Next, in step S503, the print control unit 118, based on the acquired datacasting presence/absence identification information, determines whether or not there is datacasting present for the currently selected channel. In a case in which information is acquired that indicates that datacasting is not present, the process moves to step S501. Even in a case in which, in step S501, the user instructs that datacasting be displayed, there are cases in which there is no datacasting relating to that program. As a result, in step S503, based on the datacasting presence/absence identification information, the print control unit 118 determines whether datacasting is present.

By contrast, in a case in which the print control unit 118 acquires information indicating that datacasting is present, the process moves to step S504.

In step S504, the print control unit 118 acquires from the memory unit 114 the maintenance information acquired from the printer 200 in the maintenance information acquisition process described above.

In step S505, the print control unit 118, based on the acquired maintenance information, carries out a determination as to whether or not to request that the printer 200 execute a maintenance process. In a case in which the acquired maintenance information is information indicating that it is not necessary to carry out a maintenance process prior to print execution in the printer 200, the process moves to step S501.

By contrast, in a case in which the maintenance information is information indicating that a maintenance process is necessary prior to print execution at the printer 200, the process moves to step S506.

In step S506, the print control unit 118 issues a command to the printer 200 to execute a maintenance process. The command that the print control unit 118 issues is "CreateMaintenanceJob( )", which is an expanded action of "Print-Enhanced: 1". This action is a command from an external apparatus to the printer 200 requesting the execution of a maintenance process. The printer 200, once it receives "CreateMaintenanceJob( )" from the DTV 100, executes the required maintenance process prior to print execution.

The foregoing are the various processes executed by the DTV 100 and the printer 200 in the present embodiment. First, the DTV 100 acquires in advance maintenance information from the printer 200. Then, in a case in which there is a shift to a state in which datacasting printing from the DTV 100 is anticipated, the printer 200 is made to execute maintenance in advance based on acquired maintenance information. A state in which datacasting printing from the DTV 100 is anticipated is a state in which a datacasting browse process has started.

By the above-described process, even in a case in which there is a time limit on the acquisition of print contents as with a datacasting program printing process, the possibility that a printer 200 maintenance operation might start after print order execution and the print contents become unable to be acquired can be reduced to a minimum. That is, even in a case in which there is a time limit on the acquisition of print contents, proper maintenance execution control can be carried out while at the same time the possibility that the print contents cannot be acquired can be reduced to a minimum.

(Variation of the First Embodiment)

It is to be noted that, in the first embodiment, the process of determining whether or not to cause the printer 200 to execute a maintenance process is executed in a case in which a datacasting browse process has been started. However, with current digital broadcasts in Japan, matters are such that print contents are not attached to all datacasting. Therefore, in a case in which a datacasting browse process has been started, even if the printer is made to execute a maintenance process, it is contemplated that there will be cases in which printing is not executed. That is, cases occur in which it would be difficult to say that execution of the maintenance process is effective.

Accordingly, a configuration is contemplated in which, in a case in which a datacasting browse process has been started, it is also detected whether or not print information is present for datacasting, and a determination is made as to whether or not a maintenance process is required only in a case in which print information for datacasting is present.

Detection of whether or not print information for datacasting is present can be made based on whether or not getBrowserSupport( ) is executed in the datacasting browse process described above. As described above, the execution of the expansion function DOM-API called getBrowserSupport( ) means that print information for datacasting is present. Therefore, the print control unit 118 may be configured so that, in addition to receiving a datacasting manual activation notification or a datacasting automatic activation notification, it also acquires from the datacasting browse processing unit 117 information as to whether or not the getBrowserSupport( ) attendant upon the argument ""ARIB", "APIGroup", "Print.Basic"" has been executed. It is to be noted that the acquisition of information as to whether or not the getBrowserSupport ( ) attendant upon the argument ""ARIB", "APIGroup", "Print.Basic"" has been executed may conceivably be by a method in which the datacasting browse processing unit 117 transmits directly to the print control unit 118. In addition, a method is also possible in which the datacasting browse processing unit 117 stores information as to whether or not the getBrowserSupport ( ) attendant upon the argument ""ARIB", "APIGroup", "Print.Basic"" has been executed in the memory unit 114, after which the print control unit 118 can then acquire the information from the memory unit 114.

In addition, as another method of detecting whether or not print information for datacasting is present, there is the following: In this method, it is detected whether or not one of the printFile( ) printTemplate( ), printStaticScreen( ), and printUri( ) DOM-API descriptions defined in Document 1 and Document 2 described above is present in the BML data. These descriptions all represent types of datacasting printing, that is, indicate that print information for datacasting is present.

In addition, a method is also conceivable in which an identifier is provided indicating the presence of print information in the PMT and EIT (Event Information Table) in which program information is written, and that identifier is used to detect whether or not print information is included in the datacasting for the currently selected channel.

In a case in which the present variation is applied to the flow chart shown in FIG. 5, for example, processing is as described below.

First, in step S503, after the print control unit 118 determines whether or not there is datacasting, the print control unit 118 further acquires print information presence/absence information indicating whether or not there is print information present in that datacasting. The print information presence/absence information may be detected using the methods described above. In a case in which the print control unit 118 acquires information indicating that there is print information present, processing moves to step S504 and maintenance information is acquired. Subsequent processing is the same as that in the flow chart shown in FIG. 5 described above.

Thus, as described above, the present variation makes it possible to reduce unnecessary maintenance process requests compared to a case in which the need for maintenance information is determined with the start of a datacasting browse.

[Second Embodiment]

Next, a description is given of a second embodiment of the present invention using the drawings. In the first embodiment described above, the start of a datacasting browse or the presence of print information in datacasting is used as a trigger to determine whether or not to request that the printer 200 execute a maintenance process.

By contrast, in the present embodiment a maintenance request is made of the printer in a case in which it is determined, using print history information, that a program is one with a print history. It is to be noted that constituent parts and functions that are the same as those of the embodiment described above are given the same reference numerals and descriptions thereof omitted.

(About the Print History Information Accumulation Process)

First, a description is given of a print history information accumulation process. In a case in which the user has executed datacasting printing, the print control unit 118 stores print execution information in the memory unit 114. The print execution information is stored in the memory unit 114 in association with the name of the program for which the user has executed printing, channel information, and broadcast time information (starting time and duration), enabling the user to maintain print history information on programs for which the user has executed datacasting printing.

(About the Process of Requesting the Printer Execute Maintenance)

A description is now given of a maintenance execution request process that the DTV 100 executes on the printer 200.

Figure 6:
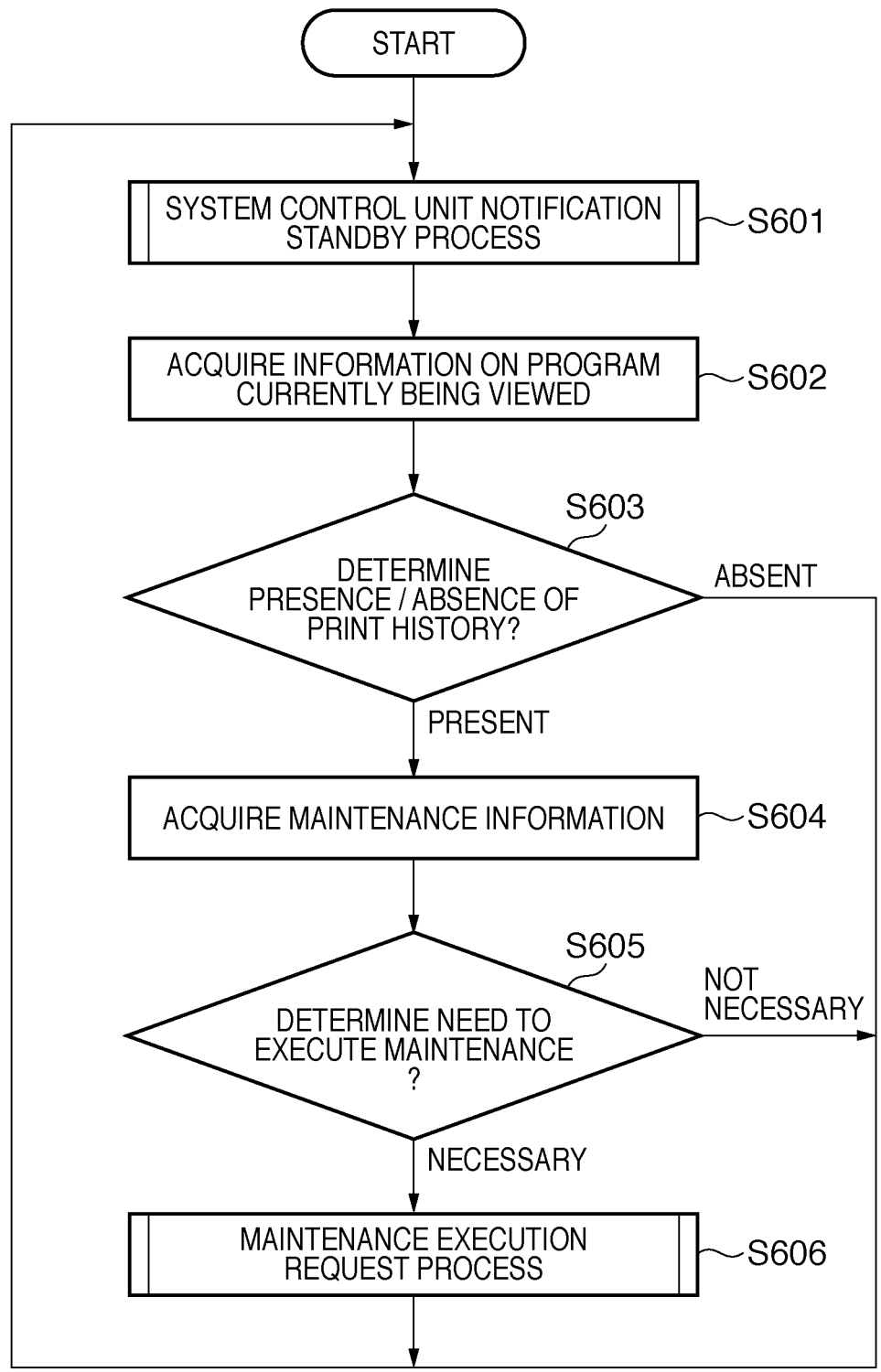
FIG. 6 is a flow chart illustrating a maintenance execution request process according to a second embodiment of the present invention.

FIG. 6 is a flow chart illustrating a maintenance execution request process in the present embodiment.

Step S601 is the same process as step S501 described above, and thus a description thereof is omitted.

Next, in step S602, the system control unit 111 acquires program information on a program currently being viewed from the memory unit 114.

Next, in step S603, the system control unit 111 determines whether or not there exists print history information that matches the program information on the program currently being viewed acquired from the memory unit 114. Specifically, using the name, channel information, and broadcast time information of the program currently being viewed, the system control unit 111 determines whether or not there exists a matching program in the print history information stored in the memory unit 114.

In step S603, if there is no program that matches the print history information, the system control unit 111 determines that the program currently being viewed is not one for which printing has been executed in the past, and moves processing to step S601.

In step S603, if there is a program that matches the print history information, the system control unit 111 determines that the program currently being viewed is one for which printing has been executed in the past, and notifies the print control unit 118 of the determination results.

The print control unit 118, when it receives from the system control unit 111 determination results indicating that the program currently being viewed matches a program for which printing has been executed in the past, moves processing to step S604.

It is to be noted that step S604 through step S606 are the same processes as those carried out in step S504 through step S506 shown in FIG. 5 described above, and thus descriptions thereof are omitted.

By the above-described process, in a program currently being viewed for which a datacasting browse process has been started, in a case in which datacasting printing has been executed in the past, it is presumed that there is a strong possibility that the user will execute datacasting printing, and a request for a maintenance process as necessary is executed. Doing so enables the maintenance process to be executed more reliably and unnecessary maintenance process requests to be reduced.

It is to be noted that in the present embodiment it is also possible to execute processing so as to determine the presence/absence of the print history information after determining whether or not print information exists for the datacasting as shown in the variation of the first embodiment. This sort of processing makes it possible to achieve more accurate maintenance process requests.

(Other Variations)

In the embodiments described above, the description assumes a printing process for datacasting as stipulated by BML data. However, the present invention is not limited to datacasting printing as stipulated by BML data. For example, in a case in which the DTV 100 is loaded with an environment that makes possible execution of Java (registered trademark)-based broadcast applications transmitted as broadcast data, a datacasting printing execution environment related to a program can be provided to the user as one capability of the application. Therefore, the need for a maintenance process may be determined using as a trigger the user activating the application attached to the broadcast and transmitted or the presence of print information in the application. It is particularly preferable to use the presence of print information in the application as a trigger to determine the need for a maintenance process.

In addition, although the present invention discloses acquiring maintenance information in advance from the printer 200, the present invention is not limited thereto. For example, there are cases in which a datacasting screen is already displayed on the DTV 100, and thereafter the power to the printer 200 is turned ON and it is possible for the DTV 100 to acquire the maintenance information. In this case, the print control unit 118 may execute the maintenance execution request process in the embodiments described above at the point in time at which the maintenance information is acquired. That is, in the present invention, it does not matter which comes first, whether the datacasting browse start process or the print information presence/absence determination process, or the maintenance information acquisition process. It is not necessary for the maintenance information to be acquired before the start of the datacasting browse process or the print information presence/absence determination process.

Moreover, in the embodiments described above, the process of acquiring the printer 200 maintenance information is accomplished with the "GetMaintenanceInfo( )", which is an expanded action of "PrintEnhanced: 1". However, the present invention does not limit the printer 200 maintenance information acquisition process to the method described above. For example, as other methods, there is expansion so that the maintenance information is included in a PrinterStateReasons that is a StateVariable of "PrintEnhanced: 1". Then, the maintenance information may be acquired with the GetPrinterAttributes( ) and GetPrinterAttributesV2( ) that are an Action of "PrintEnhanced: 1".

In addition, in the embodiments described above, when requesting that the printer 200 execute a maintenance process, a confirmation screen may be displayed on the video display unit 108 that queries as to whether or not to start the execution of maintenance. Querying the user as to the maintenance execution process enables unnecessary maintenance executions to be avoided. Of course, a notification indicating that the execution of maintenance is about to start may be displayed, without querying the user as to the maintenance execution process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-258889, filed on Oct. 2, 2007, which is hereby incorporated by reference herein in its entirety.

The invention claimed is:

1. A digital broadcast receiver that receives digital broadcasts and is capable of outputting print information included in the digital broadcast to a communicably connected printing apparatus, the digital broadcast receiver comprising:
 a control unit that determines whether a datacasting activation notification is received from a user input through a remote control device or from a broadcaster;
 a management unit that manages print history information associated with program information;
 wherein the program information comprises a program name, channel information, and broadcast starting and duration time;
 a determination unit that, once the control unit receives the datacasting activation notification, determines whether or not datacasting is present for a currently selected channel, determines whether or not print information is included in the datacasting, and determines whether a program, corresponding to the datacasting, matches program information included in the print history information managed in the management unit; and
 an acquisition unit that, acquires from the printing apparatus maintenance information indicating whether or not the printing apparatus needs execution of a maintenance process of correcting print output characteristics of the printing apparatus after the determination of whether or not the print information is included in the datacasting and determination of whether or not the program, corresponding to the datacasting, matches program information included in the print history information managed by the management unit,
 wherein the control unit, in a case in which it is determined by the determination unit that the program, corresponding to the datacasting, matches program information included in the print history information managed by the management unit, determines whether or not to issue a command to the printing apparatus to execute the maintenance process based on the acquired maintenance information, and if the determination of whether or not to issue the command is affirmative, issues the command to the printing apparatus, and in a case in which it is determined by the determination unit that datacasting is not present for the currently selected channel, the control unit does not issue the command to the printing apparatus.

2. A digital broadcast receiver control method for a digital broadcast receiver that receives digital broadcasts and is capable of outputting print information included in the digital broadcast to a communicably connected printing apparatus, the digital broadcast receiver control method comprising:
 a control step of determining whether a datacasting activation notification is received from a user input through a remote control device or from a broadcaster;
 a management step of managing print history information associated with program information;
 wherein the program information comprises a program name, channel information, and broadcast starting and duration time;
 a determination step of determining, once the datacasting activation notification is received, whether or not datacasting is present for a currently selected channel, whether or not print information is included in the datacasting, and whether a program, corresponding to the datacasting, matches program information included in the print history information managed in the management step; and
 an acquisition step of, acquiring from the printing apparatus maintenance information indicating whether or not the printing apparatus needs execution of a maintenance process of correcting print output characteristics of the printing apparatus after determining whether or not the print information is included in the datacasting and determining whether or not the program, corresponding to the datacasting, matches program information included in the print history information managed in the management step,
 wherein the control step, in a case in which it is determined in the determination step that the program, corresponding to the datacasting, matches program information included in the print history information managed in the management step, determines whether or not to issue a command to the printing apparatus to execute the maintenance process based on the acquired maintenance information, and if the determination of whether or not to issue the command is affirmative, the command is issued to the printing apparatus, and in a case in which it is determined by the determination step that datacasting is not present for the currently selected channel, the control step does not issue the command to the printing apparatus.

3. The digital broadcast receiver according to claim 1, wherein the maintenance process is a process of cleaning a print head of the printing apparatus or a process of checking blockage of the print head.

4. The digital broadcast receiver according to claim 1, further comprising a display unit,
   wherein an image that queries as to whether or not to start the execution of the maintenance process is displayed on the display unit.

5. The digital broadcast receiver control method according to claim 2, wherein the maintenance process is a process of cleaning a print head of the printing apparatus or a process of checking blockage of the print head.

6. The digital broadcast receiver control method according to claim 2, further comprising a display step of displaying an image that queries as to whether or not to start the execution of the maintenance process on a display unit.

7. The digital broadcast receiver according to claim 1, wherein the acquisition unit acquires maintenance information when the digital broadcast receiver detects the printing apparatus, or after a predetermined period of time has passed since the digital broadcast receiver detects the printing apparatus.

8. The digital broadcast receiver control method according to claim 2, wherein the acquisition step acquires maintenance information when the digital broadcast receiver detects the printing apparatus, or after a predetermined period of time has passed since the digital broadcast receiver detects the printing apparatus.

* * * * *